United States Patent [19]

Magill

[11] Patent Number: 4,473,199

[45] Date of Patent: Sep. 25, 1984

[54] ROTARY WING AIRCRAFT

[75] Inventor: Gilbert W. Magill, Odessa, Tex.

[73] Assignee: Aerospace General Co., Odessa, Tex.

[21] Appl. No.: 573,599

[22] Filed: Jan. 26, 1984

Related U.S. Application Data

[63] Continuation of Ser. No. 258,494, Apr. 28, 1981, abandoned.

[51] Int. Cl.$^3$ .............................................. B64C 27/18
[52] U.S. Cl. .................................. 244/17.11; 244/4 A
[58] Field of Search ............... 244/17.11, 17.13, 17.17, 244/17.19, 17.21, 17.25, 17.27, 8, 4 A, 16, 119; 416/20, 102, 21, 22

[56] References Cited

U.S. PATENT DOCUMENTS

| | | | |
|---|---|---|---|
| 1,812,688 | 6/1931 | De Give | 244/137 A |
| 2,444,070 | 6/1948 | Stanley | 416/102 |
| 2,601,463 | 6/1952 | Stanley . | |
| 2,690,809 | 10/1954 | Kerry | 416/22 |
| 2,745,498 | 5/1956 | Nagler . | |
| 2,761,635 | 9/1956 | Hiller, Jr. et al. | 244/17.11 |
| 2,763,447 | 9/1956 | Carrau . | |
| 2,905,410 | 9/1959 | Bensen . | |
| 3,029,047 | 4/1962 | Jacobsen et al. . | |
| 3,042,347 | 7/1962 | Halsey . | |
| 3,220,670 | 12/1965 | Fuller . | |
| 3,558,082 | 1/1971 | Bennie | 416/21 |
| 3,586,263 | 6/1971 | Payne . | |
| 3,830,588 | 8/1974 | Nagler | 416/20 A |
| 4,071,206 | 1/1978 | Magill . | |
| 4,148,594 | 4/1979 | Stafford | 416/102 |
| 4,270,711 | 6/1981 | Cresap et al. | 244/17.17 |

FOREIGN PATENT DOCUMENTS

| | | | |
|---|---|---|---|
| 458716 | 8/1949 | Canada | 416/102 |
| 2352464 | 4/1975 | Fed. Rep. of Germany | 244/16 |
| 524799 | 9/1921 | France . | |
| 686608 | 1/1953 | United Kingdom . | |

OTHER PUBLICATIONS

"Jane's All the World Aircraft", 1957-1958, p. 355, Pinwheel.

Primary Examiner—Galen L. Barefoot
Attorney, Agent, or Firm—Sughrue, Mion, Zinn, Macpeak & Seas

[57] ABSTRACT

A one-man helicopter comprising a fuselage having a rotor shaft attached thereto but offset therefrom, rotor blades having rocket engines in the tips thereof, a hub on the shaft and means on the hub between the rotor blades and the rotor shaft to change the vertical displacement of the rotor blades, said means comprising a housing pivotable about a hinged joint; the outer portion of the housing is a swash plate which is rotatable about the rotor shaft, and linkages interconnect the swash plate and the rotor blades. A handle operated by a pilot moves a yoke assembly and a tilt rod to pivot the swash plate swash bearing about a universal joint or to move the swash plate vertically on the shaft, which actions functioning through the linkages to either tilt the tip plane of the rotor blades or change the pitch of the rotor blades resulting in either forward or rearward movement of the aircraft or ascent or descent of the aircraft according to either the forward or rearward movement of the control handle or vertical movement thereof. The control handle has a throttle thereon which acts through a governor to control the flow of fuel to the rocket engines. A removable pusher propeller-engine unit is employed to lend versatility to this aircraft and to provide additional power for longer flights. A trim adjustment means provides for aligning the rotor lift axis and the aircraft's center of gravity. The pilot may use his legs as landing gear or removable skids may be provided. Fuel tanks, pilot seat and harness, and directional control tail rotor are provided. The entire structure provides a versatile aircraft which can be easily flown by the average person.

34 Claims, 25 Drawing Figures

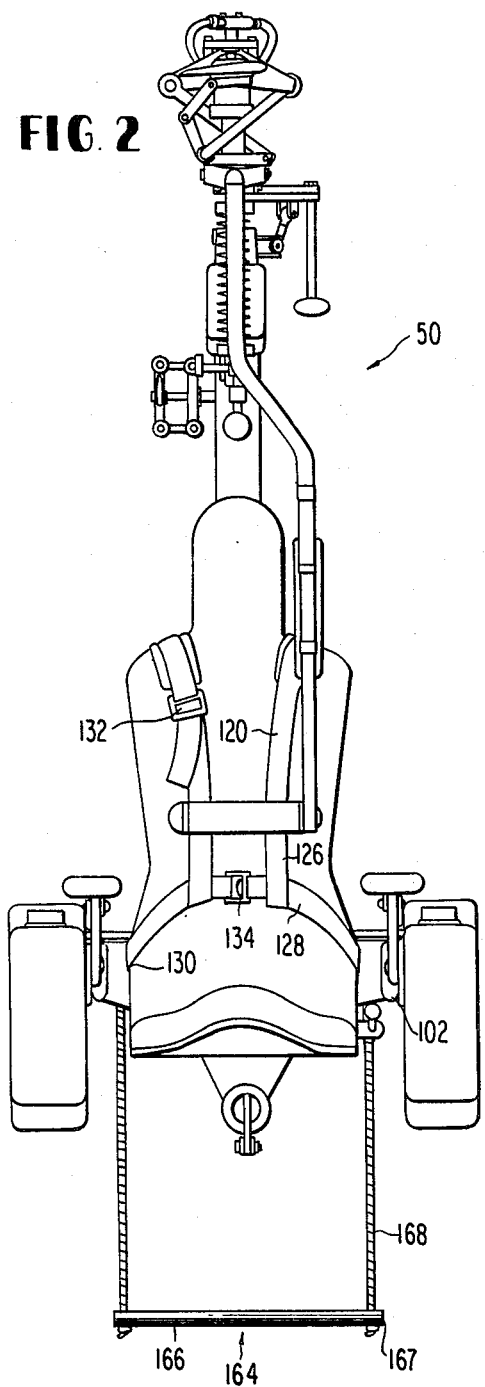
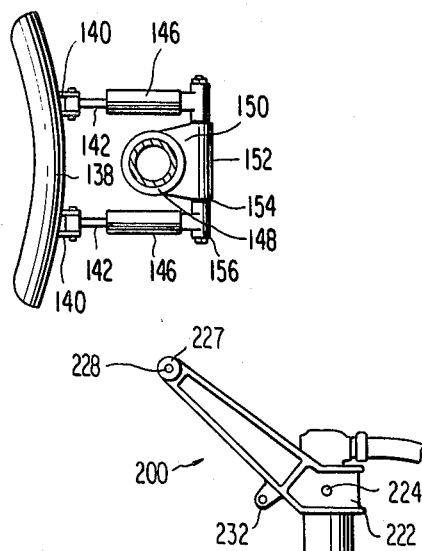
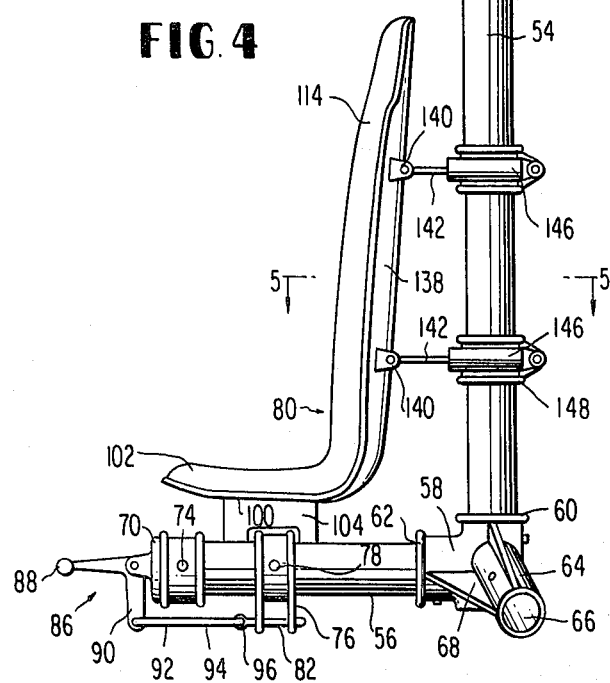
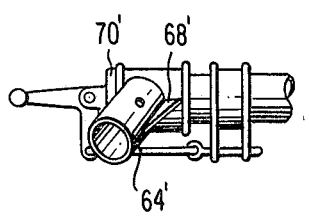

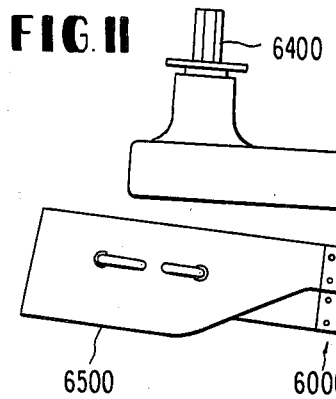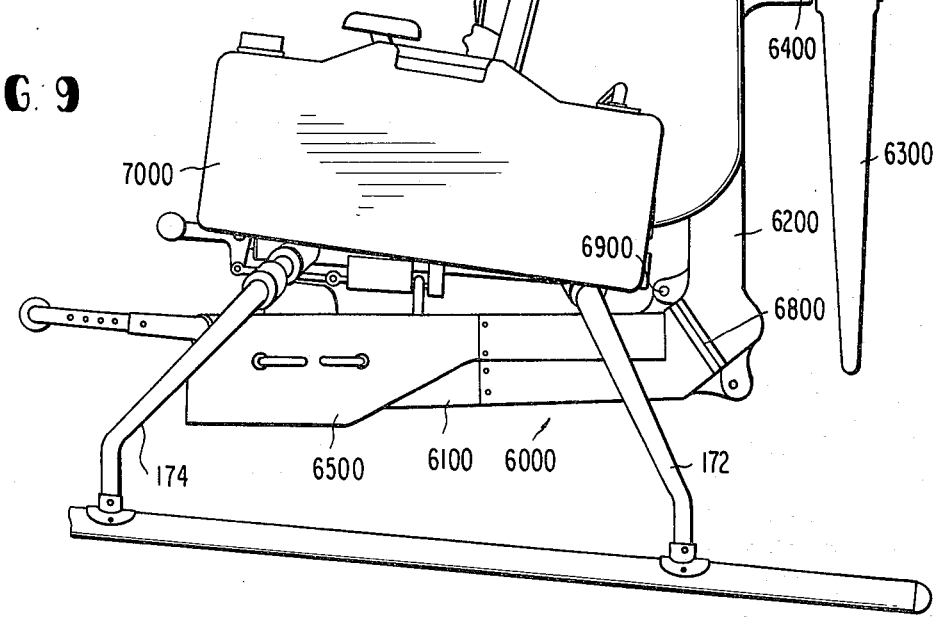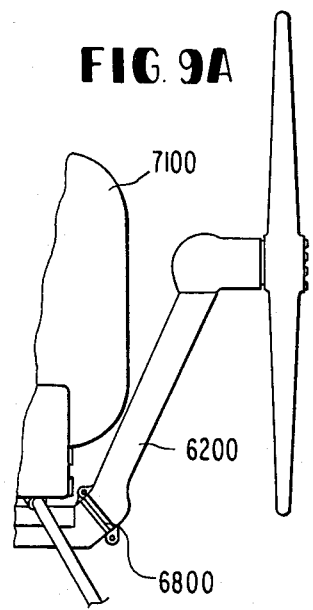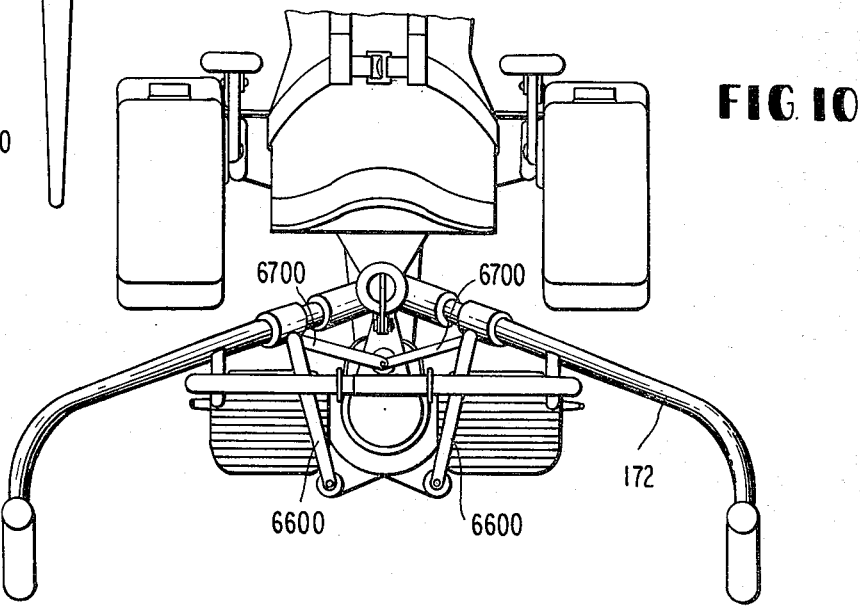

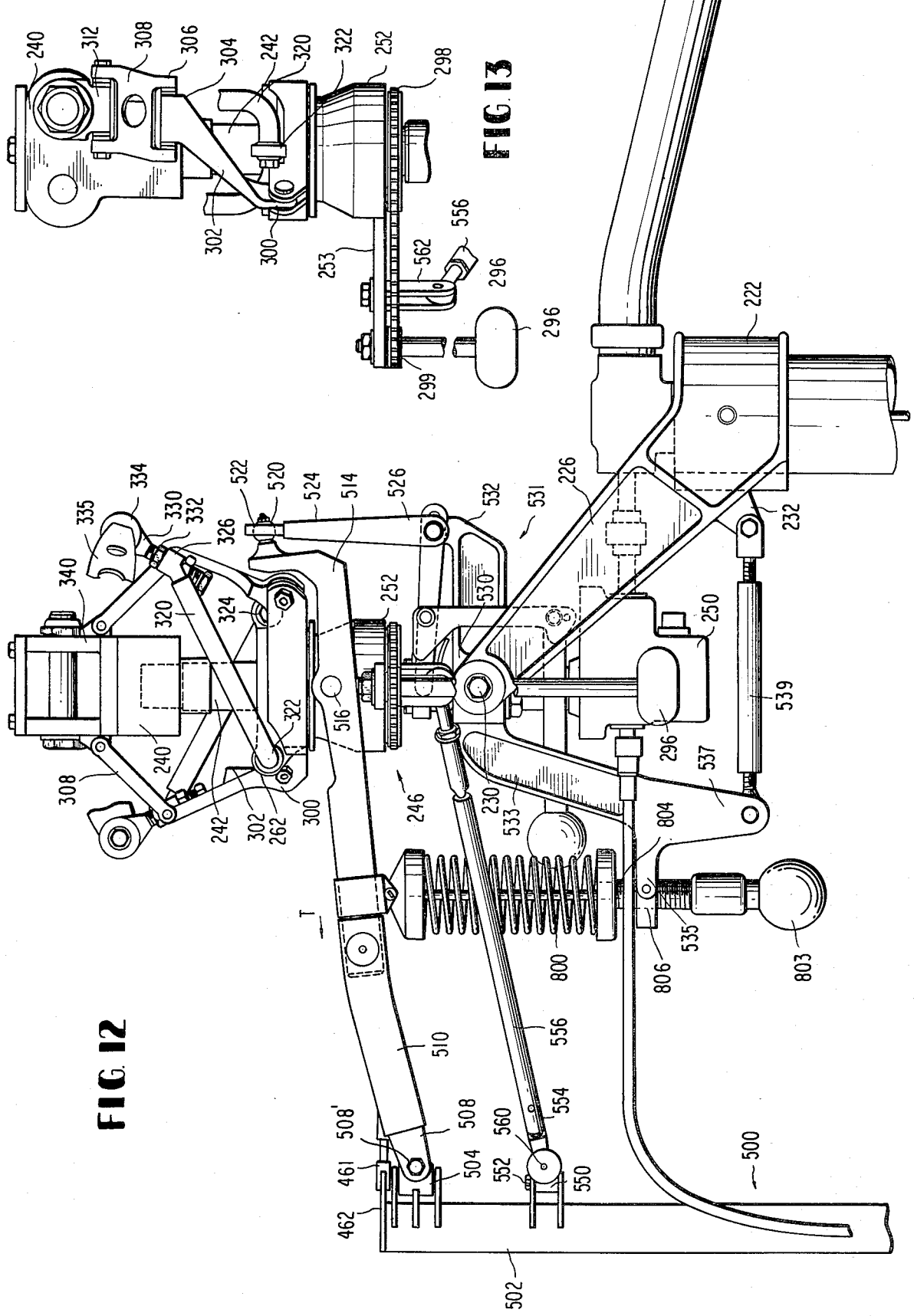

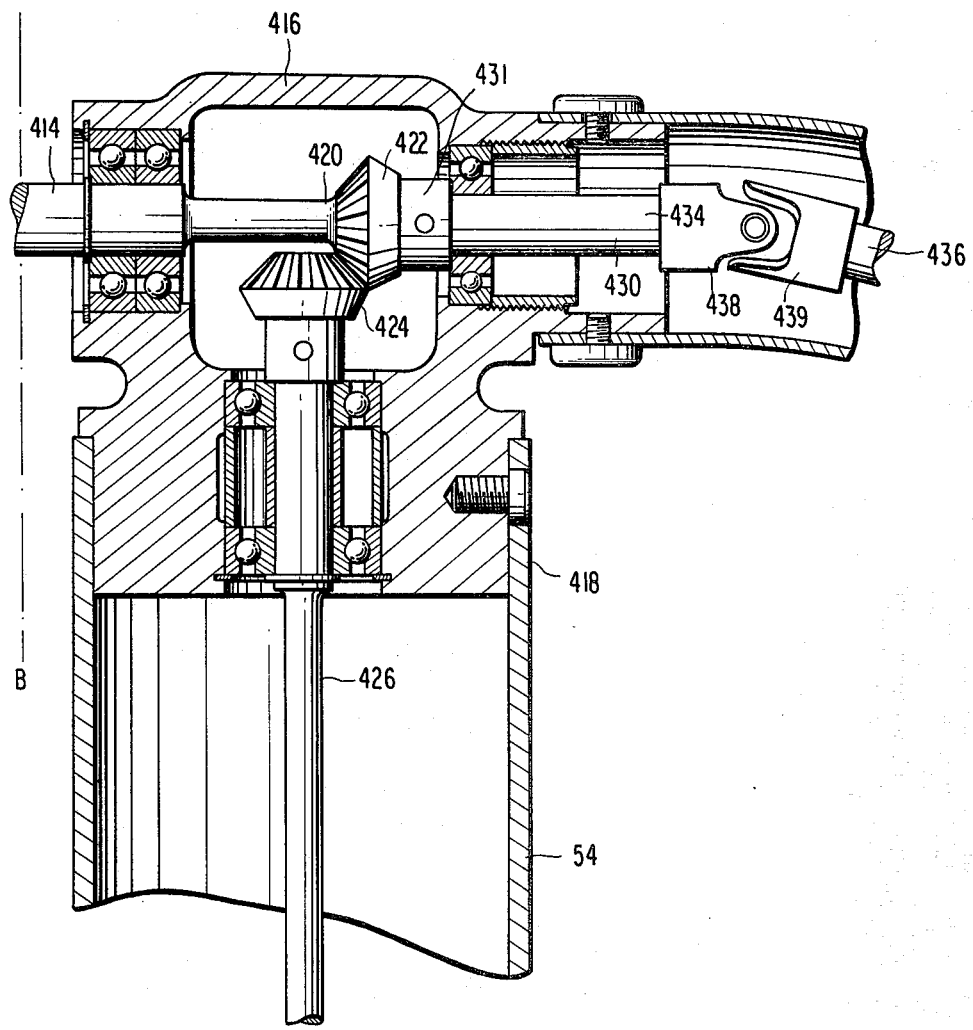

ROTARY WING AIRCRAFT

This application is a continuation of application Ser. No. 258,494, filed Apr. 28, 1981, now abandoned.

BACKGROUND OF THE INVENTION

1. Field of the Invention

This invention relates to rotary-winged aircraft of the rocket powered type and in particular to a one man helicopter which is extremely lightweight and simple in construction and which is operated by the pilot by use of a single control handle.

2. Statement of the Prior Art

Patents generally pertaining to this field of invention includes the following U.S. patents:

| Patentee | U.S. Pat. No. | Issue Date |
|---|---|---|
| Gilbert W. Magill | 4,071,206 | Jan. 31, 1978 |
| Peter R. Payne | 3,586,263 | June 22, 1971 |
| B. I. Fuller | 3,220,670 | Nov. 30, 1965 |
| D. J. Halsey | 3,042,347 | July 3, 1962 |
| E. H. Jacobsen et al | 3,029,047 | Apr. 10, 1962 |
| I. B. Bensen | 2,905,410 | Sept. 22, 1959 |
| M. J. Carrau | 2,763,447 | Sept. 18, 1956 |
| B. Nagler | 2,745,498 | May 15, 1956 |
| P. H. Stanley | 2,601,463 | June 24, 1952 |

The following foreign patents are also known to the applicant:

| Country | Pat. No. | Date |
|---|---|---|
| France | 524,799 | Sept. 1921 |
| United Kingdom | 686,608 | Jan. 1953 |

In addition, the following printed publications have been disseminated regarding rotary-winged aircraft of the type reflected in U.S. Pat. No. 4,071,206 which patent has been dedicated to the public: "Astronaut's visit mini-copter plant", no date given. "Aviation Week and Space Technology" dated Sept. 10, 1973 discusses a flight test program for a rocket powered miniature rotary-winged aircraft. This publication, in general terms, describes the fuel for the aircraft, the range of the aircraft, a pusher-type engine for the aircraft and the cost of such an aircraft. "Mechanical Engineering" dated October 1973 in which a "hot-rod MINI-COPTER" is discussed. This publication also refers to the testing of a rotary-winged aircraft, in general terms, including the use of a 90-HP gasoline engine, the fuel used to propel the rotor blades, and the weight and cost of such an aircraft. "Science and Mechanics" dated December 1973 describing, in general terms, a rotary wing aircraft utilizing rocket engines in the tips of the rotor blades and its foldable characteristics. This publication generally describes the fuel for powering the rotor blades, the rate of ascent and descent of such an aircraft under such power, its strap on and foldable characteristics, and the concept of controlling such a helicopter from a single handle operated by either hand. Note that these characteristics are very general in nature and do not describe with any degree of specificity details of the mechanical construction, power system or the specifics of the controls for the aircraft. A publication entitled "1948 Rotary Wing Pictorial Review" dated December 1948 shows in page 14 a "HOPPI-COPTER" whereby the main rotors are driven by a gasoline engine. Also the LITTLE HENRY RAM-JET helicopter which is shown on page 16 is designed for a single pilot accommodation. A circular given to military personnel and entitled "THE MOST REVOLUTIONARY AIRCRAFT EVER TO LEAVE THE GROUND" discloses, in general terms, a one man helicopter having rocket engines in the blade tips, single handle control means and convertibility means. This circular includes inserts entitled "MINI-COPTER MISSIONS" which show a one man helicopter designed for many uses and includes general descriptions of the types of missions capable with this aircraft, remote control possibilities and some power characteristics for this aircraft. "INTRODUCING THE MINI-COPTER" shows and describes in general terms a single person helicopter of small size, light weight and low price and having a single handle operating control means as well as rocket power means in the tips of the rotor blades. A publication entitled "INTRODUCING THE AEROSPACE GENERAL ITAV" discloses a one man helicopter having blade-tip power, the fuel for powering the rocket engines and specifications including speed, weight, load capacity, and rotor dimensions. As can be observed from reviewing these publications, there is no detailed mechanical constructions or interconnections shown, no description of the specific operating function of the single handle control means and no specific details with respect to the internal construction of the rocket engines and its powering means.

In addition, a publication entitled "WEST TEXAS LIFE" dated June 8, 1980 shows a one man operated helicopter describing generally the engines and single handed control system. There are no specific details shown in this disclosure which would describe in detail the mechanical nature of this invention, the mechanism of the single hand control system, nor the internal structure of the rocket power system.

SUMMARY OF THE INVENTION

One of the principal objects of this invention is to provide an aircraft which will greatly simplify the structural complexity of rotary wing aircraft. The numerous advantages of such a design will be readily apparent from a consideration of the in-flight maneuverability and the capability of landing in remote restricted areas not accessible to conventional helicopters.

A further object of this invention is to provide an aircraft which will be lightweight in construction, easy to maintain because of the absence of complex moving parts with the result that the cost of producing, servicing and maintaining such an aircraft will be within the reach of the average citizen.

A still further object of this invention is to provide a rotary wing aircraft which is powered by small rockets weighing less than a pound each located in the tips of the rotor blades and which provide as much power as a conventional 220 lb, 100 hp airplane engine. Yet, these rockets are so small and lightweight in construction that the empty weight of the aircraft is appreciably reduced, even to the point where it can be flown as a "strap on the back" helicopter.

A still further object of this invention is to provide a rotary wing aircraft with a simplified control system in the form of a single handle which incorporates cyclic, directional and collective pitch control functions as well as trottle means for the rocket engines. By use of such a simplified control system, an operator merely moves the single handle in the direction the operator wants to fly. Flight control is as follows: (1) When the handle is pushed forwardly or pulled backwardly, the cyclic pitch of the rotors is changed thus causing the aircraft to fly forwardly or backwardly as the case may be. (2) Raising or lowering the handle, causes collective pitch change in the rotors such that the aircraft will ascend or descend in response to such movements. (3) Rotating the handle about its vertical pivot causes the aircraft to turn left or right in the same direction as the handle is turned. (4) When the handle is twisted forwardly, more power is applied to increase the rotor r.p.m. to adjust to various flight conditions of weight carried, climb, speed, air density, etc.

The use of a single handle control system reduces to a fraction the usual amount of skill and time necessary to learn to fly this aircraft. Unlike conventional helicopters which require knowledge of complex mechanical movements as well as strict coordination of all four limbs of the operator, this system so simplifies flight control that people of average intelligence can learn to fly it within a matter of a few hours training time.

It is yet a further object of this invention to provide the helicopter with a governor which holds the rotor r.p.m. constant as set by the pilot, even with variations in the flight conditions. In this connection, a coordinating linkage between the throttle and collective pitch change mechanisms assists the governor in maintaining a constant rotor r.p.m. with variations in the power to accommodate changing collective pitch blade angles. Since there is no main rotor fuselage torque with tip driving power, it is unnecessary to provide the usual coordination between the main rotor collective pitch and the tail rotor pitch. This further simplifies the usual helicopter control system mechanism.

A still further object of this invention is to provide a rotary wing aircraft which may be strapped to the operator whereby the operator uses his legs as the landing gear. This feature is important where it may become necessary to land the aircraft in restricted areas such as on the side of the hill, between trees or any other place where a person can stand. However, the aircraft is provided with means for attaching a landing gear, such as skids, pontoons, skids wheels, or the like with great ease and without special skill or tools to do so. Further, the aircraft may be provided with a removable outboard motor pusher unit which will provide additional range for the aircraft.

These and other objects of the present invention will become apparent from a consideration of the following specification when read in conjunction with the annexed drawings.

BRIEF DESCRIPTION OF THE DRAWINGS

FIG. 2 is a front elevational view showing the seat and harness arrangement, the control handle, a fuel container on each side of the seat, arm rests, and a cable supported foot rest bar.

FIG. 4 is a side view of the aircraft showing the fuselage and keel with seat attachments.

FIG. 5 is a top plan view taken along the line 5—5 of FIG. 4 showing the seat attachments to the fuselage.

FIG. 8 is a side view of the front of the keel showing front landing gear attachment fixture added thereon.

FIG. 9 is a side elevational view of a further modified embodiment of the invention showing the aircraft with a detachable and foldable outboard propeller motor unit.

FIG. 9A is a side view of a modified form of the propeller motor.

FIG. 10 is a front view of the aircraft of FIG. 9 showing the propeller motor mounted on the landing gear.

FIG. 11 is a view of the propeller motor unit in folded condition with the propeller removed.

FIG. 12 is a side view of the control assembly including the swash plate assembly and connections therefor, rotor, hub and rotor control handle assembly connections, all of which are mounted above the fuselage.

FIG. 13 is a rear view of FIG. 12 showing frictional adjustment means for the pivotable bell housing and the swash plate drive arms.

FIG. 15B is a sectional view of the fuel pump drive and tail rotor drive shafts.

DESCRIPTION OF THE PREFERRED EMBODIMENT

Figure 1:
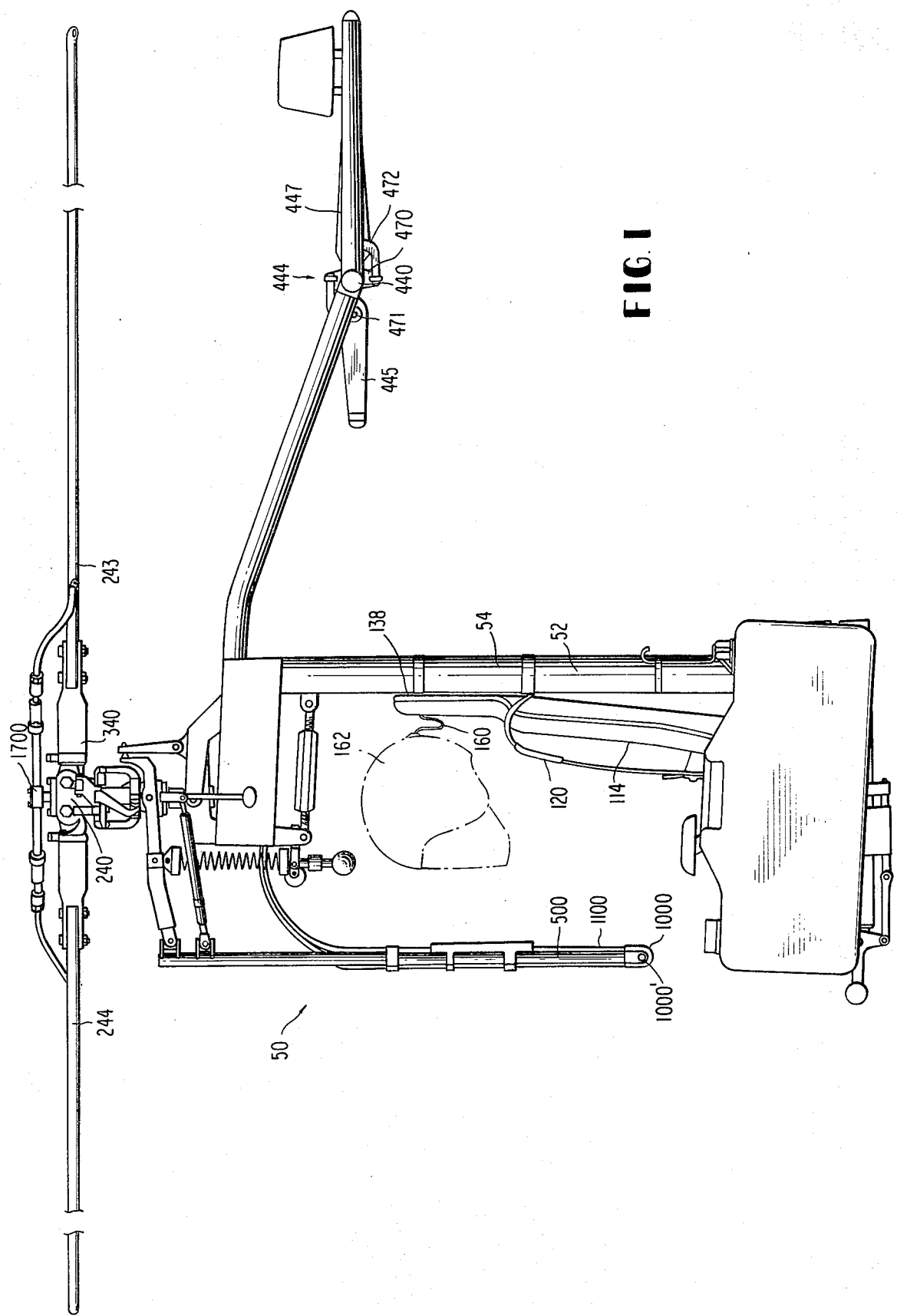
FIG. 1 is a side view of the rotary wing aircraft wherein the pilot uses his feet as landing gear and shows a fuselage having at the upper end thereof a main rotor, main rotor control assembly, a control handle attached at the upper end to the rotor control assembly, a tail boom extending from the top of the fuselage, a tail rotor having a "V" tail surface, a seat, fuel tanks attached to the lower end of the fuselage on either side of the seat, and a cargo look with a disconnect handle.
Figure 3:
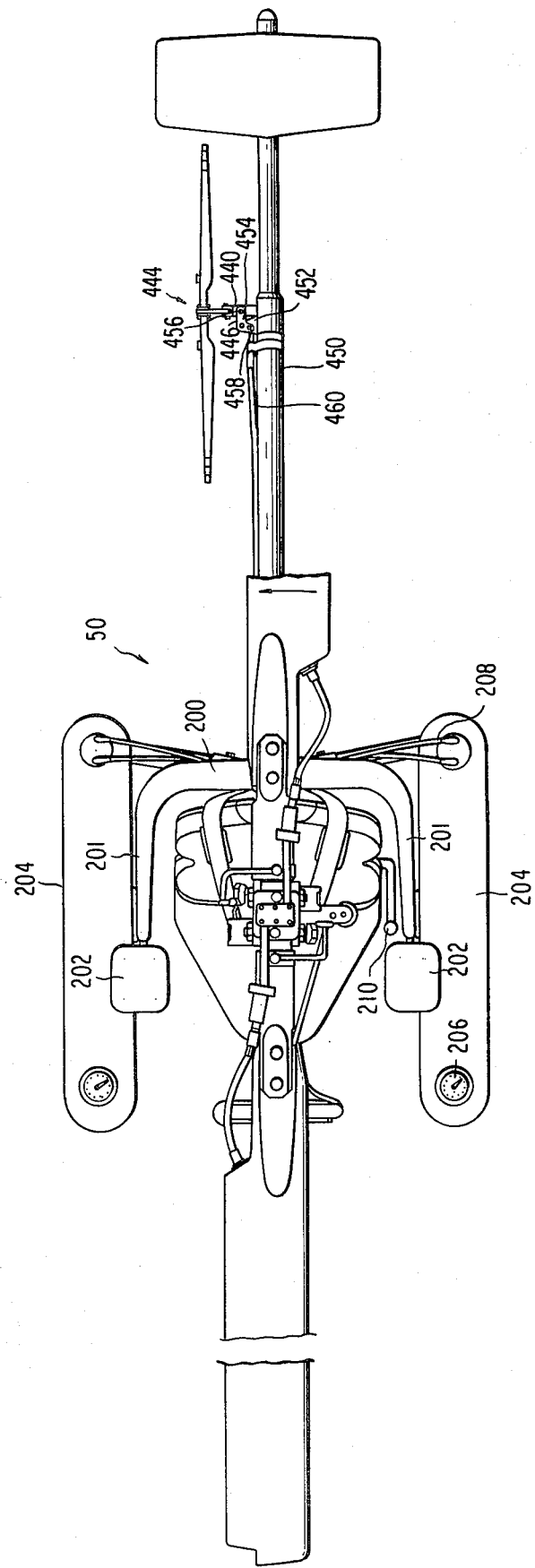
FIG. 3 is a top plan view of the aircraft of FIGS. 1 and 2.
Figure 6:
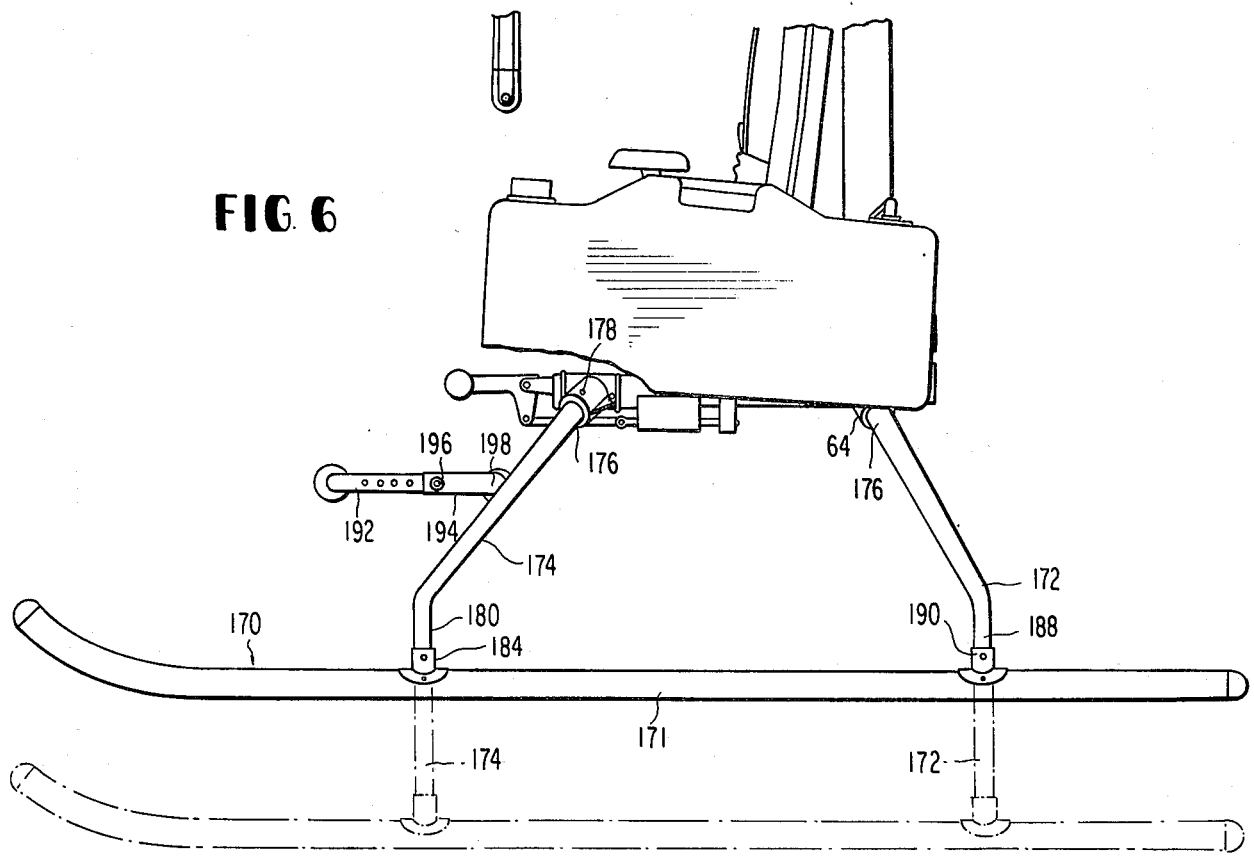
FIG. 6 is a modified embodiment of the aircraft of FIG. 1 showing a skid landing gear attachment to fittings on the fuselage.
Figure 7:
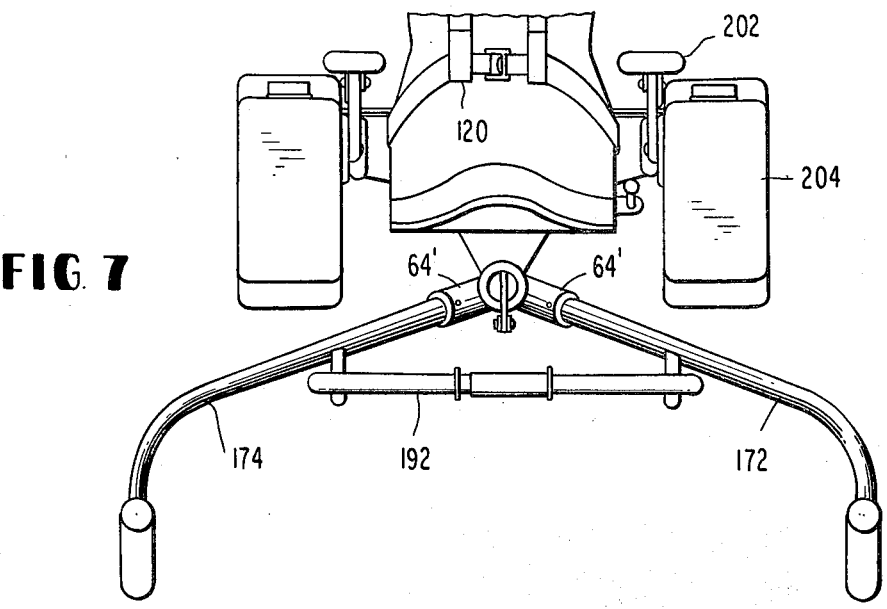
FIG. 7 is a front elevational view of the aircraft of FIG. 6.

Referring to drawing FIGS. 1, 2 and 3 in more detail, the helicopter of this invention is generally designated by reference numeral 50 and includes a fuselage assembly 52 which comprises hollow fuselage 54 having a keel 56 attached thereto by a fitting 58. The fitting 58 is a generally L-shaped tubular member having openings 60 and 62 for slidably receiving the ends of fuselage 54 and keel 56. Tubular extensions 64 are provided on the fitting 58 (one shown) have openings 66 for the reception of landing gear support legs to be more fully explained below. Reinforcement webs 68 connect the fittings 58 and extensions 64 to provide strength for the extensions. The keel 56 is provided with an end fitting 70 which slides onto the front end of keel 56 and is secured thereto by quick-disconnect bolt 74. The keel 56 is provided with a bracket 76 which is secured to the keel by a screw 78. The bracket 76, in conjunction with pin 82, functions to support suspended cargo. The end 70 has a pair of ears 84 (one shown) which pivotally support a bell crank 86. The bell crank 86 has a handle 88 and a lever 90 to which there is attached an end 92 of a rod 94. The rod 94 is attached at 96 to pin 82 which is retracted by handle 88. A cargo hook is releasably supported by the pin 82 which is activated by the pilot pulling up on lever 88.

A seat 80 has a base 100 and pad 102 which is constructed from any suitable material to support an average pilot. However, the material used will preferably be bullet resistant in nature to protect the pilot in suitations where the aircraft is employed in military operations. The base 100 is attached to the keel 56 by means of cushioning material 104 which is designed to absorb shock when the vehicle is landed abruptly and forcibly. The cushioning material 104 is secured to the base 100 by any suitable means and to the keel 56 by suitable releasable means (not shown). The base 100 and pad 102 are contoured to comfortably support a pilot. Front panel 114 is continuous with the base 100 and is contoured to a pilot's upper back, neck and head. The pilot engaging surfaces 102 and 114 may have additional shock absorbing means to absorb shocks in the event of abrupt landings.

A shoulder engaging harness strap 120, FIGS. 1 and 2, is secured to the fuselage 54 by rings permitting the strap to be slidably attached thereto. The lower ends 126 of the harness are secured to a lap belt 128, FIG. 2. The ends of lap belt 128 are secured at ends 130 to fuselage 54 by any suitable means. A buckle 132 is provided for adjusting the shoulder harness 120 and a similar buckle 134 is provided for adjusting the lap belt 128. A bullet resistant front breast plate (not shown) may be used in conjunction with the harness to give added protection to the pilot during military missions.

The back 138 of seat 80 is provided with pairs of brackets 140, FIGS. 4 and 5 (one each shown) which pivotally support the ends of shock absorbing pistons 142, the opposite ends of which extend into shock absorbing cylinders 146. The shock absorbing cylinders 146 are secured to the fuselage 54 by means of collars 148. The collars 148 are provided with extensions 150 which terminate in bearing cylinders 152. The bearing cylinders 152 pivotally support rods 154 whose ends 156 are secured to the shock absorbing cylinders 146.

An additional shock absorber 160 may be employed with the pilot's helmet and may be secured to the back 138 adjacent the neck or head area thereof. This shock absorber may be in the nature of a flexible cable which will have an end attached to a pilot's helmet 162 and will function to limit the forward movement of a pilot's head in the event of a abrupt forward landing or collision. A support 164 for the pilot's feet comprises a horizontal bar 166 having its ends 167 secured to the lower ends of cables or the like 168. The upper ends of the cables are secured to fuel tank support means 201 which is attached to the fuselage 54.

In this embodiment of the invention, the aircraft is designed to be strapped onto a pilot who uses his feet as the landing gear. This construction is advantageous where it may be necessary for a pilot to land in rough terrain or on the side of a steep hill where conventional helicopters are unable to land.

Landing gear is readily attachable to the aircraft by means of the tubular extension 64 or modified end cap 70' shown in FIG. 8. The end cap 70' will replace end cap 70, FIG. 4 and has tubular extensions 64' and reinforcements 68' similar to reinforcements 68 of FIG. 4. The end cap 70' is provided with a bell crank, rod and pin fitting similar in construction and functions as 86 shown in FIG. 4.

The landing gear 170 may be in the form of skids 171 as shown in FIGS. 6, 7, 9 and 10. The skids 171 are provided with a pair of rear legs 172 (one shown) and a pair of front legs 174. The ends 176 of the rear and front legs are slidably received into the tubular extensions 64 and 64' of fitting 58 and 70'. Any suitable fastening means such as quick-disconnect pins 178 may be employed to releasably secure the legs within the tubular extensions. The lower ends 180 and 188 of the rear and front legs 172 and 174 are secured within fittings 184 and 190 with quick-disconnect pins and the fittings are attached to skids 171 by any suitable means. As can be readily seen by this construction, various types of landing gear may be easily attached to the aircraft without any skill required on the part of an operator and without use of any special tools. Further, the legs may be extendible so as to vary ground clearance and to permit large cargo crates to be carried between the legs and skids. A foot rest 192 is adjustable in tubular supports 194 by a quick disconnect pin 196. The foot rest is pivotable up or down on a pivot 198.

As best seen in FIG. 3, the aircraft is provided with a U-shaped bar 200 having extension arms 201. The U-shaped bar, and arms 201 are fastened to the fuselage 54 by suitable means such as welding or the like. The extension arms 201 are used to support elbow rests 202 at the terminal ends thereof. Fuel tanks 204 are releasably attached to the extension arms 201 by any suitable quick means (not shown) which may be activated during in-flight conditions. The fuel tanks are provided with fuel meters 206 and fuel feeding lines 208 which lead to rocket motors located in the tips of the rotor blades. A vent line is also attached to each tank. A handle 210 of an auxiliary hand pump is provided to pressurize the fuel within the fuel lines to force fuel to the rocket motors for initial starting. A vent is provided in the tanks to prevent pressure build-up therein.

The fuselage 54, FIG. 4, is provided with a fitting 200 comprising a collar 222 which is secured to the upper end thereof by fastening means 224. Integral with the collar 222 and extending upwardly thereof and forwardly of the fuselage are a pair of parallel arms 226 (one shown). The ends 227 of the arms 226 distal from the collar have holes 228 therein for reception of a bolt 230 used to secure the main rotor base 530, FIG. 12, to the upper end of the fuselage. One of the arms 226 has a bracket 232 thereon adjacent to the collar 222, its function to be described below.

The pair of parallel upwardly extending arms 226 functions to support the main rotor shaft and the flight control assembly all of which will be more fully described below.

Figure 14:
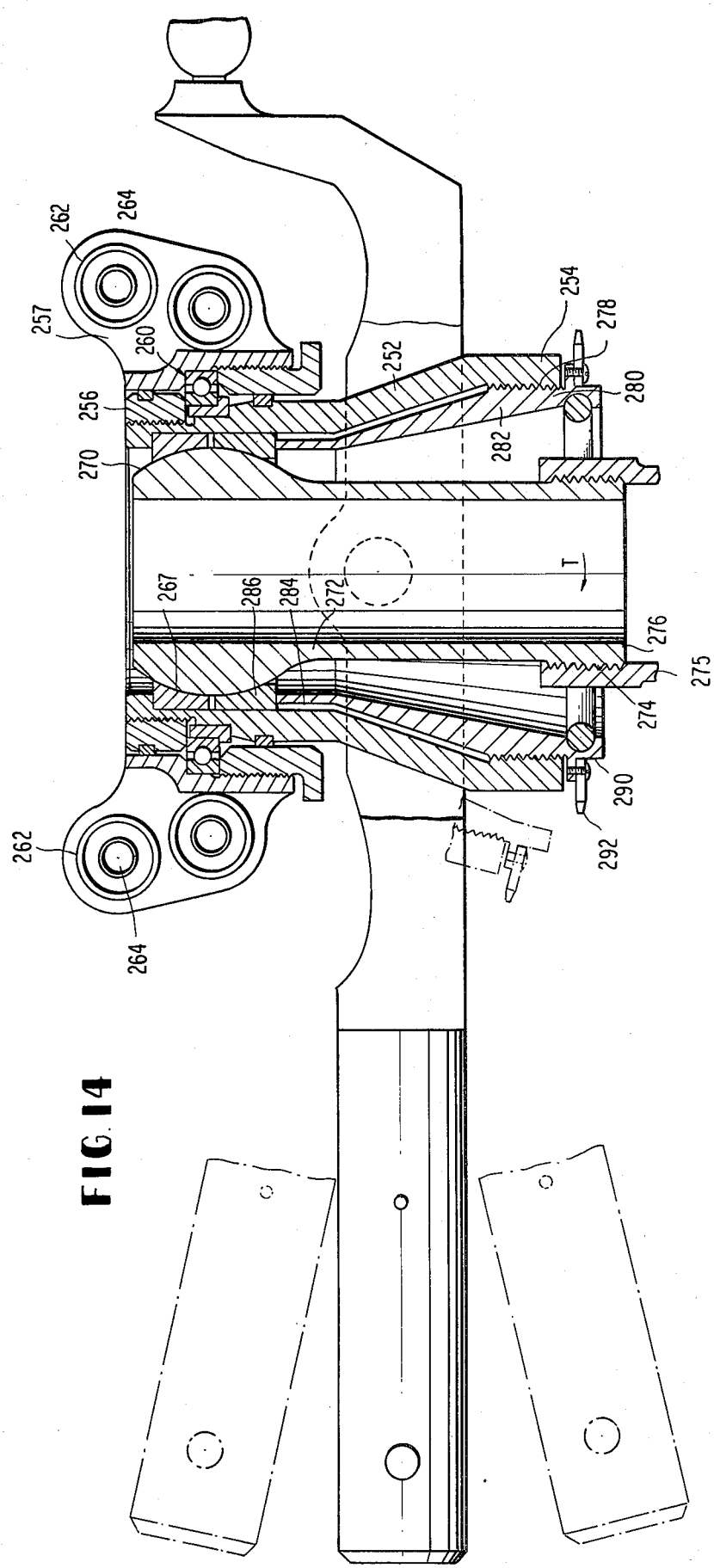
FIG. 14 is a cut away view of the bell housing with frictional adjustment means therefor, and the swash bearing assembly.
Figure 20:
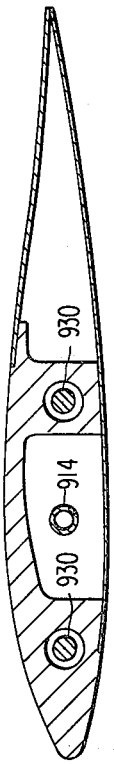
FIG. 20 is a sectional end view along the line 23—23 of FIG. 21 of a rotor blade showing the fuel line passing therethrough to the rocket motor located in the tip thereof.

Referring to FIGS. 12 and 13, the main rotor assembly comprises a rotatable rotor hub 240 to which are attached rotor blades 243 and 244 as best seen in FIG. 1. In FIG. 12, non-turning rotor shaft 242 is attached at its top to the hub 240 by means of ball bearings (not shown). The shaft extends through the housing assembly 246 with the lower end thereof extending into and secured to rotor base 530. A gear box 250 is located below, yet between, the pair of parallel arms 226. The housing 252, FIG. 14, is cone shaped in cross-section having a large bottom open end 254 and a small upper end 256 as shown in FIG. 14. A swash plate drive ring 257 is rotatable on the upper end of the housing 252 by bearings 260. The swash plate drive ring 257 is provided with plural ears 262 having hole 264 therein for use in connecting various linkages which will be described below. Within the housing 252 adjacent the upper end 256 there is a concave curved bearing surface 267 which rides on the upper outer periphery of spherical end 270 of sleeve 272. The sleeve 272 is hollow and rides on the rotor shaft 242 extending therethrough. The lower end 276 of sleeve 272 is threaded at 274 for purposes of receiving a collar 275 thereon which has studs (not shown) that attach to the mechanism that raises and lowers the entire swash plate assembly to provide collective pitch change. The lower end 254 of housing 252 is threaded on the inside surface 278 and is adapted to receive a threaded extension 280 of a second smaller cone shaped housing 282. The second smaller cone shaped housing 282 is threaded into the end of housing 252 and is adjustable inwardly and outwardly therefrom so that the bearing surface 286 adjacent to upper end 284 thereof rides on the lower outer perhiphery of spherical end 270. The exterior end 290 of housing 282 has a sprocket wheel 292 thereon which is connected through a chain 298, FIG. 13, to a sprocket 299 on the end of an adjusting handle 296. The handle 296 rotates in bushings in the outer end of bracket 253 which is an extension of housing 252. The handle rotates the chain 298 and sprockets 292 and 299 to increase or decrease the pressure of the curved bearing surface 286, FIG. 14, against the lower periphery of spherical end 270. Increasing or decreasing the frictional pressure on spherical end 270 of sleeve 272 functions to hold the housing firmly or loosely from tilting on the spherical end 270, as desired by each individual pilot.

The plurality of ears 262 on the swash plate drive ring 257, FIGS. 12, 13 and 14, support ends 300 of a pair of swash plate drive arms 302. The upper ends 304 of the drive arms 302 are hingedly connected to the lower ends 306 of drive linkages 308 whose upper ends are hingedly connected to flapping hinges 312 which are bolted to the main rotor hub assembly 240. Thus, when the main rotors turn on shaft 242, the swash plate drive linkage rotates on the element 257 by means of the connections to the drive linkages. A pair of rotor blade pitch change cross linkage rods 320 are connected at their lower ends 322, as best seen in FIG. 12, to the swash plate drive ring ears 262 by bolts or the like 324. The upper ends 326 of the cross linkage rods 320 are attached to pusher rods 330 by adjustment bolts 332. The upper ends 334 of the pusher rods 330 are attached to blade pitch change arms 335, the opposite ends of which are attached to the main rotor housing 340 as best seen in FIGS. 1 and 12.

As will be readily understood, the swash plate drive linkages, which are in the form of scissors, are connected to the rotors at one end and to the outer portion of the swash plate at the opposite end so that upon rotation of the rotors, the outer portion of the swash plate also rotates. Further, the pitch change linkages function to change the blade pitch cyclically and collectively as the swash bearing tilts, or moves up and down.

Figure 15A:
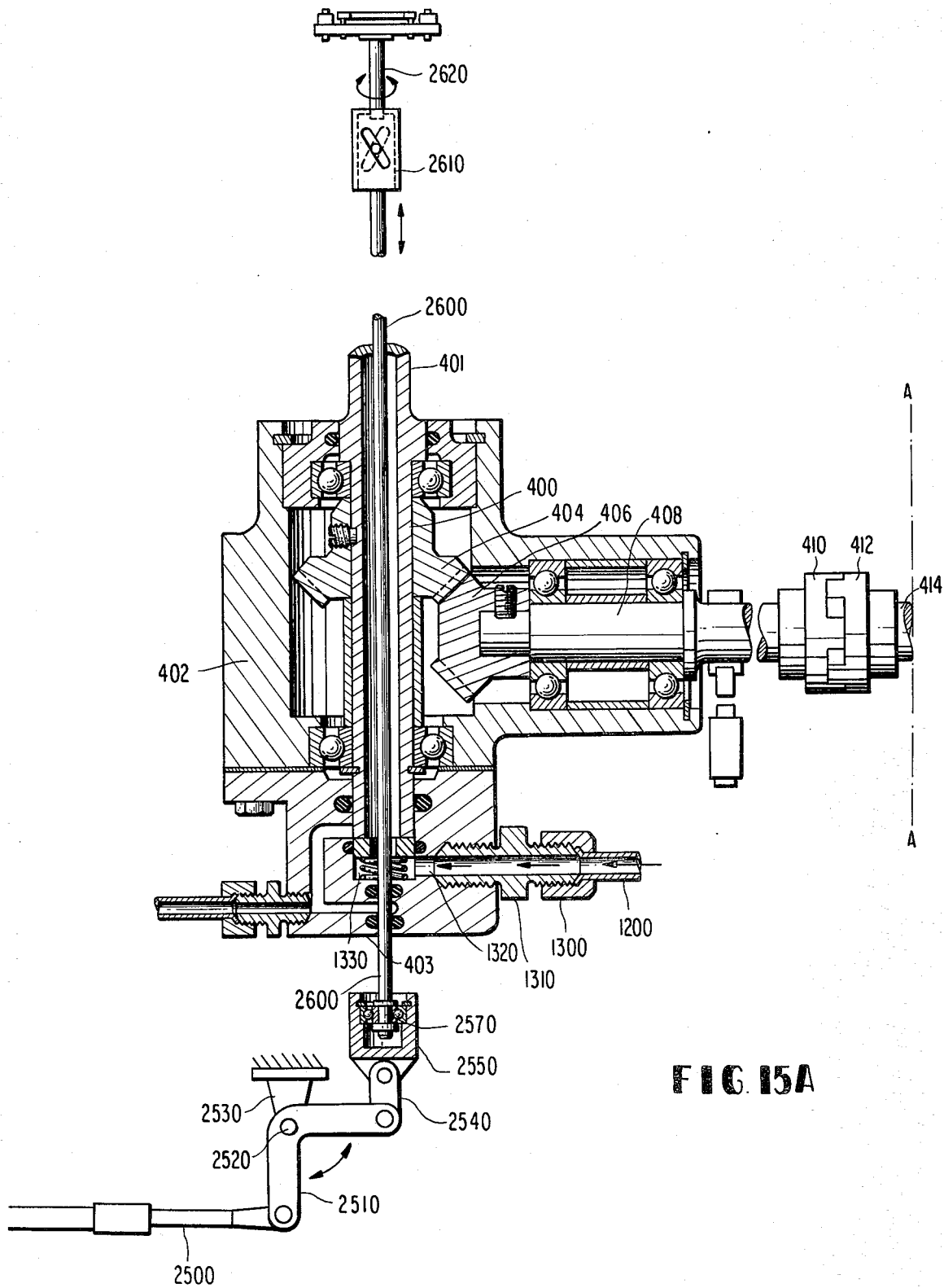
FIG. 15A is a sectional view of the main rotor driven fuel stem, power take-off gears, and governor control mechanism.

As best shown in FIG. 15A the end 400 of a fuel stem 401 terminates in gear box housing 402. The terminal end of the fuel stem 401 has a gear 404 which meshes with a gear 406 of a shaft 408. The fuel stem 401 extends through the rotor shaft (not shown) and is attached at its upper end (not shown) to the hub for rotation therewith. The extreme upper end of the fuel stem extends through the hub and into a housing above the hub and this feature will be explained in more detail below. The shaft 408 has a coupling 410 which meshes with a coupling 412 of a rod 414. Rod 414, FIG. 15B, enters a gear housing 416 which is secured to the top 418 of the fuselage 54. The terminal end 420 of rod 414 has a gear 422 which meshes with a gear 424 of a rod 426. The opposite end of rod 426 is connected to the fuel pump (not shown). Thus, when the fuel stem 401 is turning within the rotor shaft 242 by means of its connection to the hub, the opposite end of which is connected to the pump of the fuel tanks, the pump is thus operated to supply fuel to the rocket engines.

Gear 422 has a rod 430 journalled thereon at its end 431. The opposite end 434 of the rod 430 is connected to a rod 436 by connectors 438 and 439. The opposite end of the rod 436 has a gear (not shown) which meshes with a gear (not shown) on the end of tail rotor support rod 440, as best seen in FIG. 3. Thus, the tail rotor rotates upon rotation of the fuel stem 401 through the latters interconnection with the tail rotor drive shaft and the hub and main rotor blades. The support rod 440 carries a tail rotor 444 which may have its pitch changed by means of a bell crank 446. The bell crank 446 is pivotally secured to the tail rotor boom 450 by a bracket 452. The end 454 of the bell crank is attached to the tail rotor pitch change arms by suitable links 456. The opposite end of bell crank 458 is attached to a flexible cable 460. As shown in FIG. 12, the opposite end 461 of the flexible cable 460 is attached to an arm 462 which arm is rigidly attached to the terminal end 502 of a control handle 500.

In FIG. 12, the terminal end 502 of control handle 500 is pivotable about a vertical axis by means of hinge 504 which is attached by a horizontal axis to an end 508 of a yoke arm 510. The yoke arm 510 is connected to the housing 252 inwardly of the distal end 514 by means of a stud 516 or the like. End 514 of yoke arm 510 has a ball type nipple 520 which is received within a socket 522 of a fulcrum anchor likage arm 524. End 526 of fulcrum anchor linkage arm 524 is attached to the horizontal leg 532 of a support bracket 531. The support bracket 531 is L-shaped in configuration having the horizontal leg 532 adjustably secured to the pair of upwardly extending support arms 226. The other vertical depending leg 533 of the L-shaped bracket has a horizontal leg 535 integral therewith adjacent the distal end 537. The end 537 of the L-shaped bracket has a turn buckle 539 attached at one end thereto, the opposite end of which is attached to a bracket 232 integral with both of the support arms 226 adjacent the collar 222. Adjustment of the turn buckle functions to tilt the entire rotor assembly about pivot 230 fore and aft for longitudinal trim and to change the center of gravity of the main rotors.

When the control handle 500 is raised vertically, yoke arm 510 is fulcrumed on linkage 524 thus slidably raising the housing 252 and the swash plate assembly 246 vertically on the rotor shaft 242. This action acts on pitch change linkages 320, which are attached to the rotor blades and function to increase the pitch of the main rotors. This action is commonly referred to as collective pitch control which, through aerodynamic pressures, causes the aircraft to ascend. Similarly, when the handle control 500 is pulled downwardly, the housing 252 and the swash plate assembly 246 slide downwardly on the main shaft 242 thus acting on the pitch change linkages 320 which, as above, act to decrease the pitch of the main rotor blades causing the aircraft to descend as is well known in the art.

The control handle 500 has a second bracket 550 pivotable on a vertical axis 552. One end 554 of a tilt rod 556 is horizontally pivoted to bracket 550 on a horizontal axis 560. The opposite end of tilt rod 556 is pivotally connected to a bracket arm 562, FIG. 13. The bracket arm 562 is rigidly attached to housing 252 by a bracket 253. The handle 500 acting through the tilt rod permits the pilot to control the direction of flight of the aircraft. As for example, a pilot desiring to go forward, pushes handle control 500 forwardly, pivoting about the bolt 508'. This action is translated through the tilt rod 556 which is connected at one end to the housing 252 causing the lower end 254 of the housing 252 to move forwardly in the same direction as the handle, as shown by the dotted lines in FIG. 14. The housing 252 and swash plate drive ring 257 pivots on the spherical end 270 of sleeve 272 such that the swash plate drive ring tilts in the direction of the arrow (T), as shown in FIG. 14. This causes the pitch change rod 320 to push on pusher rod 330 which action tilts the main rotor blades so that the front of the tip plane of the disk created by the rotary blades is tilted slightly downwardly and forwardly thus causing the aircraft to move in the forward direction. When the handle is moved rearwardly or from side to side, the tip plane of the rotor blades will tilt in the direction of movement of the handle thus causing the aircraft to move in that direction. As can be seen, the action of the control handle 500 permits the pilot to control the aircraft by using one hand.

Since the control handle is pivotable about vertical axis of brackets 504 and 550, movement of the handle about that axis pushes or pulls on the end 461 of flexible cable 460, as best seen in FIG. 12. The opposite end of flexible cable 460 operates a bell crank 446 such that the angle of pitch of tail rotor 444 changes in response to such pivotable movement of control handle 500, as shown in FIG. 3. This action will cause the tail rotor to cut through the air thus pushing the tail of the aircraft right or left depending upon whether the control handle is rotated to the right or left. Thus, the entire aircraft is caused to pivot about the rotor thrust axis which corresponds to the vertical axis of the rotor shaft 242.

As shown in FIG. 1, tail rotor blades 445 and 447 of the tail rotor 444 are individually pivotally attached to the support 440 by means of pivot bolts 471. Leaf springs 472 attached to bracket 470 keep the blades radially positioned. The individual rotor blades so attached facilitates rearward pivoting of the individual blades in the event that either of them strikes an obstruction such as maintenance personnel or or other obstructions. Use of leaf springs allows the individual blades to flex away from the object thus preventing damage to the rotor blades or preventing injury to an individual.

As shown in FIG. 12, mounted between the yoke assembly 510 and the bracket 535 of L-shaped bracket 530 is a spring 800 which is compressible between the yoke arm assembly 510 and the bracket 535 by means of twist grip 803 which has a threaded end 804 threadably received within an aperture 806 in bracket 535. By manually increasing or decreasing the compression of spring 800 by the twist grip 803, the control handle 500 becomes higher or lower so as to allow an individual pilot to adjust for different pilot hand support pressure on the control handle. Individual pilots may thus adjust the collective pitch assembly to suit his physical choice in this regard. Similarly, a pilot may adjust the cyclic pitch frictional control handle 296 to frictionally adjust the surface pressures of the bearings 267 and 286 against the spherical end 270, as shown in FIGS. 12 and 14. This adjustment means also permits a pilot to determine the force necessary to tilt the housing 252 about the spherical end 270.

The structure of the main rotor blades 243 and 244 is best seen in FIGS. 20, 21, 22 and 23. The tips 890 of the rotor blades carry small rocket engines 900 secured therein. The rocket engines 900 are the subject of applicant's pending application Ser. No. 898,271 filed Apr. 18, 1978, the contents of which are incorporated herein by reference.

Figure 21:
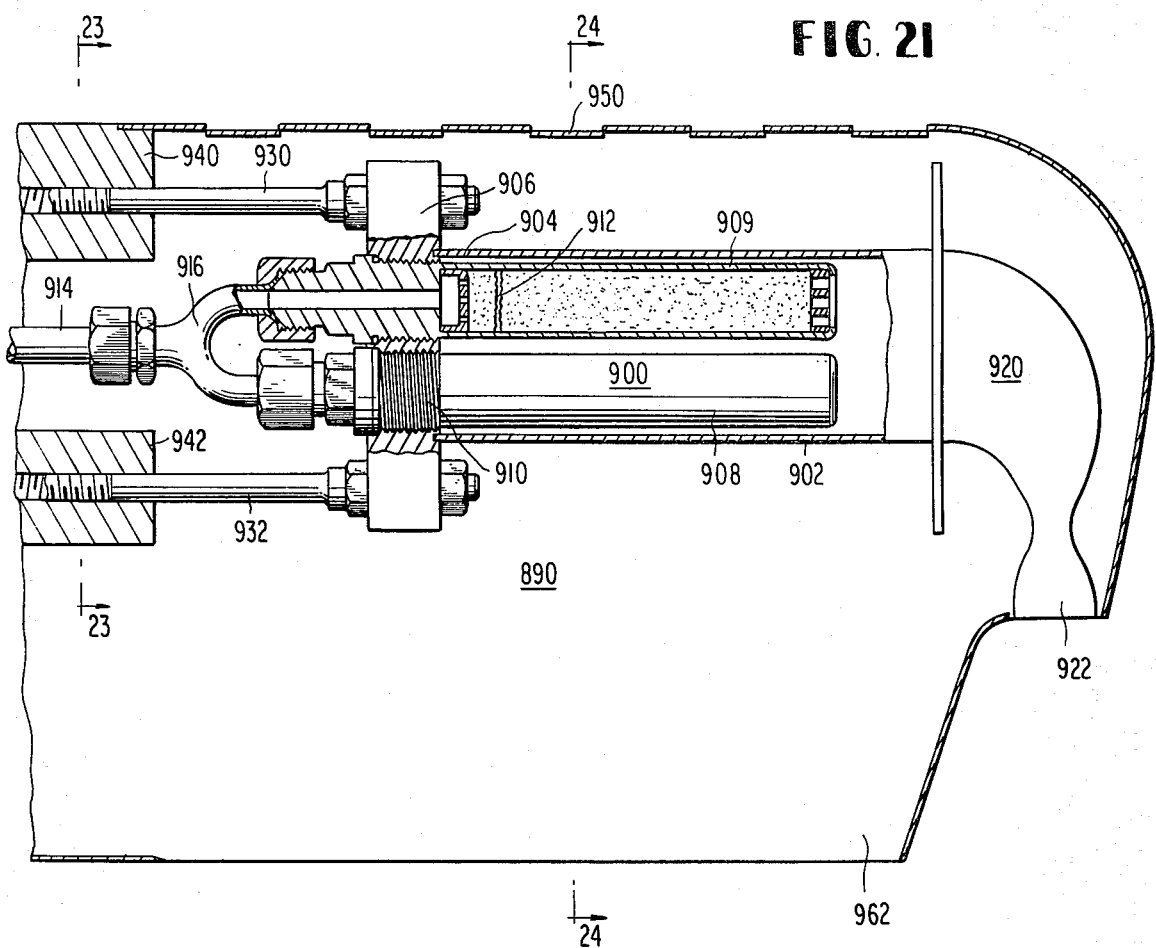
FIG. 21 is a plan view of the rocket motor and rotor blade tip broken away to show slots in the leading edge of the rotor blade near the tip thereof, support rods for the rocket motor and the fuel line.
Figure 22:
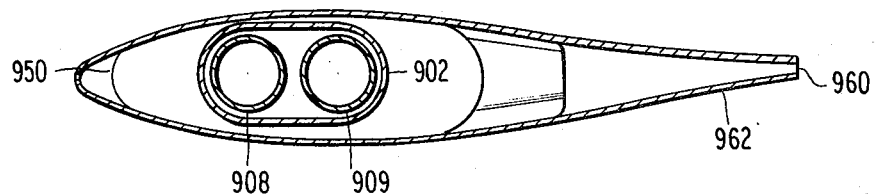
FIG. 22 is a sectional view of the rotor tip taken along the line 24—24 of FIG. 21 showing the tip of the rotor having the rocket motor therein and slots in the front edge of the rotor blade for permitting air to enter the interior of the blade and which flows over the rocket motor and support rods to cool same and exits from a slot in the trailing edge.

As shown in FIGS. 21 and 22, the rocket engines 900 (one to be described) comprise a housing 902 which has one end 904 welded on or otherwise secured to a single block 906. Removably supported in the block 906 and within the housing 902 are a pair of catalyst containing canisters 908 and 909. Each canister is secured to the block 906 by threads 910. Further, each canister contains spaced stacks of silver screens 912 (one shown) which serve to decompose fuel fed from the fuel tanks through line 914. The fuel enters a bifurcated line 916 which channels the fuel into each of the chanisters wherein the fuel decomposes upon encountering the silver screens 912. The resultant decomposition of the fuel creates high-pressure steam which enters chamber 920, expanding violently and exiting through nozzle 922. The high pressure exit of the gas from nozzle 922 creates a force ($F_t$). The corresponding reactive force ($F_r$) causes the rotor to revolve about shaft 242. Rods 930 and 932 secure the rocket engines to the outer ends 940 and 942 of the rotor blade spars.

Figure 23:
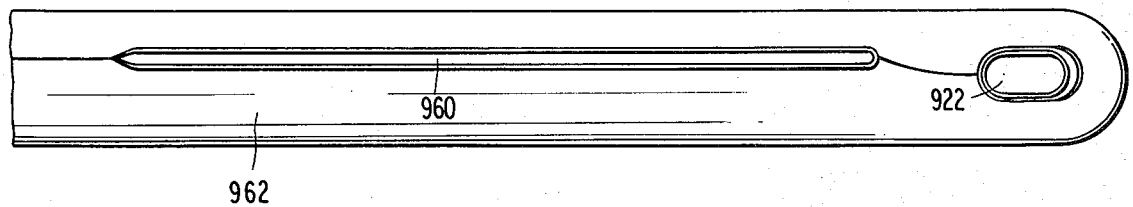
FIG. 23 is a view looking forward from the trailing edge of the rotor blade showing an opening slot therein adjacent the tip thereof for permitting the cooling air to exit the interior of the blade.

Each blade tip has openings 950 at the leading edges 952 which permits air to flow interiorly of the blade and around the rocket engines. As shown in FIG. 23, slot 960 is provided in the trailing edge 962 of each blade which permits the air entering openings 950 to exit the blade. Thus, the rocket engines are cooled by the action of the air rushing thereover.

Figure 18:
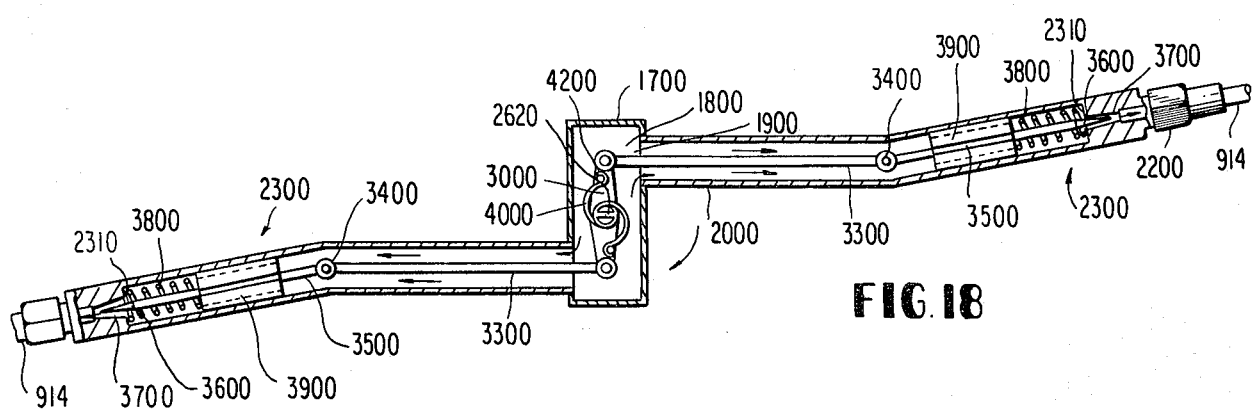
FIG. 18 is a top sectional view of the governor having compression spring means for the valve needles and torsional spring means for the governor control rod.
Figure 19:
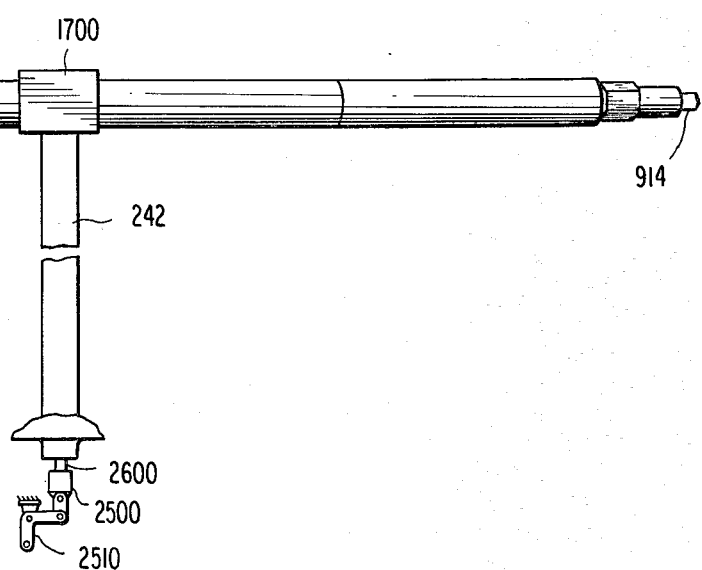
FIG. 19 is a side elevational view of the governor and connections to the trottle handle.

Fuel for the rocket engines is provided by a pump which operates off pump drive shaft 426 which extends within the fuselage 54, FIG. 15B. As best seen in FIG. 1, a throttle 1000 is provided on the end 1100 of control handle 500. The fuel lines 208, FIG. 3, from the tanks 204 may be contained within the hollow fuselage 54 and may exit at any convenient location adjacent the top 418, FIG. 15B. The two fuel lines 208 merge into a single line at any location adjacent the bottom of the fuselage and form a single line 1200, FIG. 15A, which by means of fittings 1300 and 1310 enters a passage way 1320 into a chamber 1330 in gear box 402. The chamber 1330 is open to the hollow interior of fuel stem 401. A suitable fluid rotary seal is used to prevent fuel from escaping out of the gear housing 402. The fuel flows under pressure from the fuel pumps through line 1200 and through the fuel stem 401 to a terminal end housing 1700, FIG. 1 and FIG. 18. As shown in FIG. 18, fuel enters the interior 1800 of terminal end housing 1700 which is provided with exiting ports 1900. Exiting ports 1900 have connecting lines 2000 to the fuel lines 914 by a suitable fitting 2200. The connecting lines 2000 have valves 2300 therein which are operable through the throttle 1000 on control handle 500.

The throttle 1000 is rotatable about a horizontal axis 1000' and is connected through suitable linkages (not shown) to a rod 2500, FIG. 15A, which is connected to a bell crank 2510. The bell crank 2510 is pivotably attached at 2520 to a rigid support 2530. The bell crank 2510 is attached to a lever 2540 which is secured to a housing 2550. An end 2570 of a rod 2600 is secured within the housing 2550. The rod 2600 extends through the bottom 403 of the gear box 402 and extends vertically and interiorly of rotor shaft 242 and the fuel stem 401. The upper distal end of the rod 2600 is connected to one end of a suitable linkage 2610. The opposite end of the linkage has a shaft 2620 rotatably connected thereto. The opposite end of the shaft 2620 extends through the terminal end housing 1700 and is connected to a pivot link 3000 within said housing, as seen in FIG. 18. The pivot link 3000 is pivotally secured to the end of the rod 2620 and is rotatable therewith. Secured to the link 3000 are a pair of rods 3300 which connect at 3400 to valve stems 3500. The needle ends 3600 of valve stems 3500 extend into valve seats 3700. A pair of compression springs 3800 are compressed between weights 3900 and the outer ends of the valve bodies 2300. The springs act to maintain the needles 3600 unseated within the valves apertures 3700.

As can be appreciated, rotation of the throttle 1000 causes reciprocation of the rod 2500 which acts on the bell crank 2510. The bell crank, in response to reciprocation of the rod 2500, acts on the housing 2550 which in turn acts on the rod 2600 moving the same upwardly or downwardly. The linkage 2610 at the end of the rod 2600 functions to cause rotation of the rod 2620 upon vertical upward or downward motion of the rod 2600. Upon counter clockwise rotation of the rod 2620, which is connected to the link 3000, rods 3300 and needles 3500 are drawn away from the valve seat 3700 allowing fuel to flow into the fuel line 914 in proportion to the amount of rotation of the throttle. A spring 4000 is affixed to the bracket 3000 at 4200 and to the end of rod 2600 within the terminal end housing 1700 and serves to adjust the governor between 600 and 700 r.p.m.

Figure 16:
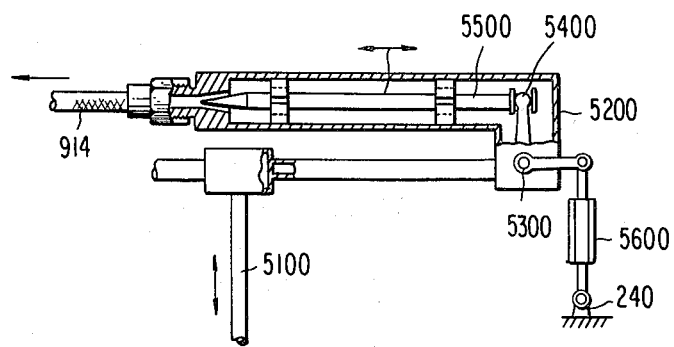
FIG. 16 is sectional view of a fuel control valve, fuel control stem and adjustable turn buckle means for the valve.
Figure 17:
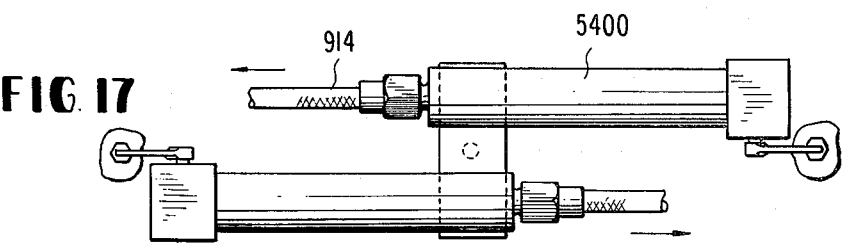
FIG. 17 is a top view of the fuel valves and feed lines to each of the rocket motors.

Alternatively, the throttle valve within the governor 5000, FIG. 16, may be operated by the throttle 1000 which acts through conventional linkages to move rod 5100 up and down. This action is translated to a link arm 5200 which pivots on axis 5300. The opposite end 5400 of the link arm 5200 is attached to valve stems 5500 which operate as a throttle valve without a governor. A turn buckle 5600 has one end attached to the hub 240 and the opposite end also attached to link arm 5200. Fine adjustments may be made to the valves of this throttle by means of adjusting the turn buckle 5600.

In order to permit the helicopter to attain greater range, a removable and foldable outboard propeller motor 6000, FIGS. 9, 9A, 10 and 11 is provided. The motor 6000 is L-shaped in configuration having a horizontal leg 6100 and a vertical leg 6200. A propeller 6300 is attached to its shaft 6400 in a conventional manner. The horizontal leg 6100 contains a gasoline engine which is covered by a shroud 6500. The engine and shroud are supported on the legs 172 and 174, by rods 6600 and 6700 and by cargo hook 82. The motor 6000 is foldable at juncture 6800 by means of a hinge joint 6900. Suitable gearing and gear trains connect the transmission of the engine to the propeller. Gasoline tanks 7000 replace the rocket fuel tanks 204. A rocket fuel tank 7100 is attachable to the fuselage 54 by any suitable means. The rocket fuel tank is contoured so as to fit about the fuselage and to permit the vertical leg 6200 to lay perfectly vertical. However, a modified form of the vertical leg is shown in FIG. 9A. This construction allows the elimination of a depression in the tank by constucting the joint 6800 such that the vertical leg slants outwardly away from the tank 7100.

The various features of the invention described herein are intended to be illustrative only and numerous modifications and changes will be readily apparent to those skilled in the art, and are not intended to limit the invention to the precise construction and operation shown and described herein, and accordingly, all suitable modifications and equivalents may be resorted to without departing from the scope and spirit of the invention.

What I claim is:

1. A rotary wing aircraft comprising:
   a hollow tubular fuselage having a pair of forwardly extending parallel arms attached at an upper end of the fuselage;
   a keel attached at right angles to said fuselage by an L-shaped fitting;
   a seat attached to said fuselage and to said keel;
   a U-shaped bar having extension arms attached to said fuselage, elbow rests at the ends of said extension arms;
   fuel tanks removably attached to said extension arms;
   main rotor blades rotatably supported on a shaft;
   said shaft supported on said forwardly extending parallel arms attached at the upper end of said fuselage;
   means supported on said shaft above said pair of forwardly extending parallel arms for adjusting the angular cyclic pitch and angular collective pitch of said main rotor blades;
   pilot operable control handle attached to said means whereby said pilot may adjust the angular cyclic pitch and the angular collective pitch of said main rotor blades;
   a tail rotor for said aircraft operable through a gear housing attached at an upper end of said fuselage;
   means interconnected with said pilot operable control handle for adjusting the collective pitch of said tail rotor;
   rocket engines in tips of said rotor blades;
   fuel flow means from the fuel tanks and extending through the fuselage to the rocket engines;
   pump means operable through said rotor blades to pump fuel from the fuel tanks to the rocket engines; and valve means in the fuel flow means operable through said pilot operable control handle to vary the flow of fuel to the rocket engines.

2. A rotary wing aircraft as described in claim 1, wherein:
said tubular fuselage is hollow and is extendible and retractable to attain different lengths.

3. A rotary wing aircraft as described in claim 1, and:
said tips of said rotor blades having openings in the trailing and leadings edges thereof for directing air over said rocket engines.

4. A rotary wing aircraft as defined in claim 1, wherein:
said fuselage has a pair of upwardly and forwardly extending parallel arms and said shaft is movably secured within said pair of parallel arms so as to tilt fore and aft.

5. A rotary wing aircraft as defined in claim 1, and:
a gear box mounted on said fuselage having means therein for rotating said tail rotor and for driving fuel pumps, said means operable from the main rotor and a hand operated pump to start rotation of the main rotor.

6. A rotary wing aircraft as defined in claim 1, wherein:
said means for controlling the angular cyclic pitch of said rotor blades comprising; a housing rotatable and pivotable about a spherical end of a sleeve, a swash plate rotatable about said housing, linkage means attached to said swash plate and to said rotor blades, and means for pivoting said housing about said spherical end of said sleeve to adjust said linkage which operates to change the angular cyclic pitch of said rotor blades with respect to their pitch change axis thereby tipping the plane of the rotor blades in response to pivoting of the housing.

7. A rotary wing aircraft as defined in claim 1, wherein:
said tail rotor has blades which are pivotally mounted but retained in a radial position by leaf springs.

8. A rotary wing aircraft as defined in claim 1, wherein:
said seat is attached to said keel by shock absorbing means.

9. A rotary wing aircraft as defined in claim 1, and:
said seat is attached to said fuselage by shock absorbing means.

10. A rotary wing aircraft as defined in claim 1, and:
said seat is bullet resistant and has harness means for securing a pilot thereon.

11. A rotary wing aircraft as defined in claim 1, and:
said rocket engines comprising; a housing fixed to a unitary block, catalyst chambers within said housing, said catalyst chambers fastened to said unitary block, fuel feeding means from said tanks extending through said rotor blades to the catalyst chambers, and means for securing said rocket engines within said rotor blades.

12. A rotary wing aircraft as defined in claim 1, wherein:
said means for adjusting the angular collective pitch of said main rotor blades comprising; a housing movable on said shaft, a swash plate rotatable about said housing, linkages means connected to said swash plate and to said rotor blades, and means for moving said housing, swash plate and linkages therefor vertically on said shaft, said linkages acting on said rotor blades to increase or decrease the collective pitch of said blades.

13. A rotary wing aircraft as defined in claim 1, where:
said pilot operable control handle pivotable near its upper end about lateral and vertical axis to a yoke assembly, said yoke assembly pivotable about a lateral axis near its rear end to a housing and attached to an anchor at its extreme rear end whereby upon vertical upper movement of said handle, said housing having a swash plate and linkages moves vertically along said shaft increasing the collective pitch of said main rotor blades.

14. A rotary wing aircraft as defined in claim 13, and:
a tilt rod pivotable at one end on vertical and lateral axes to said upper end of said handle and at the other to the housing whereby when said handle is moved forwardly or rearwardly relative to the vertical axis of the fuselage, the housing pivots about a spherical end of a sleeve thus longitudinally moving said linkage between the swash plate and said rotor blades causing cyclic pitch change of said main rotor blades whereby the tip plane of the rotor blades tilts opposite to the direction of tilt of the housing.

15. A rotary wing aircraft as defined in claim 4, and:
said upwardly and forwardly extending pair of parallel arms are integral with a collar and said collar is removably attached to the upper end of the fuselage.

16. A rotary wing aircraft as defined in claim 1, and:
said shaft is hollow and is adapted to permit passage of a fuel stem, said fuel stem having its extreme lower end extending into a gear box located below said pair of parallel arms, a gear on said stem near the extreme lower end thereof meshes with a second gear to which there is attached a first rod having a coupling on the end thereof, the coupling interconnects with a similar coupling on the end of a second rod whose rear end extends into a gear box atop the fuselage, the end of said second rod having a gear thereon which meshes with still another gear having a rod which extends interiorly of the fuselage to operate a fuel pump, one end of a third rod is attached to the gear at the end of the second rod, the end of the third rod having a coupling thereon which interconnects with a similar coupling on a tail rotor drive rod, this latter rod extending within a tail rotor boom which is rigidly attached to the gear box atop the fuselage, and said gear couplings and rods driven upon rotation of the main rotor to drive said tail rotor and said fuel pump.

17. A rotary wing aircraft as defined in claim 6, wherein:
said housing is conical in cross-section having a bearing surface within the smaller end of the cone, the top portion of the spherical end of said sleeve bearing against said bearing surface, a smaller housing complimentary to said housing is rotatably adjustable within said housing and has a bearing surface thereon which bears against the lower portion of the spherical end of said sleeve, sprocket means on the outer end of the smaller housing cooperating with a sprocket on the end of a handle through the interconnection of a chain, the handle being rotatably attached to the outer side of said housing so that when the handle is rotated the smaller housing is moved into and out of said housing whereby the bearing surface of the smaller housing increases or decreases the frictional engagement with the lower portion of the spherical end of said sleeve thus controlling the force which must be used to tilt said housing on the spherical end of said rod.

18. A rotary wing aircraft as defined in claim 14 and:
said tilt of the main rotor tip plane occuring according to the direction of movement of the pilot operable handle whereby the aircraft is caused to move in the direction of movement of the handle.

19. A rotary wing aircraft as defined in claim 13, and:
said anchor is pivotally attached to a horizontal leg of an L-shaped bracket, said L-shaped bracket is pivotally attached to the forward end of said upwardly extending parallel arms, a flange having threaded aperture thereon extends horizontally of the depending leg of said L-shaped bracket and adjustable means attached between said yoke assembly and said flange to frictionally control the movement of the handle in a vertical direction thus permitting a pilot to determine the force necessary in consideration of his physical characteristics to move the handle vertically.

20. A rotary wing aircraft as defined in claim 12, and:
said linkages are crossed whereby forward tilting of said housing causes the linkages to tilt the tip plane of said main rotor rearwardly so that the aircraft will move in the rearward direction.

21. A rotary wing aircraft as defined in claim 1, wherein:
said means for adjusting the pitch of said tail rotor comprises a flexible cable assembly attached at one end to an offset bracket rigidly secured to the upper end of the control handle, the opposite end of said flexible cable assembly connected to one arm of a bell crank, the opposite end of said bell crank is attached to the tail rotor pitch change mechanism so that turning of the control handle about a vertical axis causes the flexible cable assembly to pull or push on the bell crank thus acting to change the pitch of the tail rotor, the result of which causes the tail rotor to push the air left or right thus forcing the tail rotor to turn the aircraft in the same direction as the handle is turned.

22. A rotary wing aircraft as defined in claim 7, and:
said tail rotor comprising a pair of blades attached to the tail rotor support by leaf spring plates such that the tail rotor blades may flex on said leaf spring plates in the event the blades contact an obstacle.

23. A rotary wing aircraft as defined in claim 1, and:
said fitting between said fuselage and said keel having said tubular extensions thereon, and further, a fitting on the front end of the keel having tubular extensions and lever control means thereon for supporting landing gear rear and front support legs which are releasably secured within said tubular extensions, skids releasably attached to said legs, bracket means on said keel between said fittings, a releasable rod slidable within said bracket means, and said lever connected to said releasable rod operable to retract said rod releasing cargo held thereby.

24. A rotary wing aircraft as defined in claim 1, and:
a pusher propeller motor removably attached beneath said keel, the propeller mounting pylon of said pusher propeller motor being foldable near to where it attaches to the engine crank shaft, and fuel tanks for said pusher propeller motor and for said rocket motors.

25. A rotary wing aircraft as defined in claim 24, and:
said pusher propeller motor defining an L-shaped structure the top vertical end of which lies adjacent to the fuselage and having a propeller extending therefrom, and the horizontal end of which is attached beneath the keel and supported by legs of the aircraft.

26. A rotary wing aircraft as defined in claim 25, and:
said pusher propeller motor removable from said legs and from beneath said keel and foldable at the juncture of the vertical and horizontal portions thereof and a propeller removable from the propeller shaft thus providing a unit which is storable in a compact manner.

27. A rotary wing aircraft as defined in claim 26, and:
said fuel tank for said rocket engines removably attached to said fuselage and contoured so that the sides of said tank extend around the fuselage and propeller pylon.

28. A rotary wing aircraft comprising:
a hollow tubular fuselage having a pair of forwardly extending parallel extension arms;
a keel attached at right angles to said fuselage by a tubular fitting having hollow tubular extension members for supporting landing gear;
a hollow rotor shaft mounted on the extension arms of the fuselage;
main rotor blades mounted on said shaft;
rocket engines mounted in tips of the rotor blades;
means between said main rotor blades and said extension arms of the fuselage for changing the angular cyclic pitch and the angular collective pitch of the main rotor blades;
said means comprising a housing pivotable on a universal joint and slidable on said shaft and crossed linkages connecting said housing and said rotor blades;
pilot operable control means for pivoting said housing on said universal joint and for sliding said housing on said shaft;
fuel tanks having fuel conveying lines extending through the fuselage, said fuel conveying lines converging and connected to a fuel stem which extends through the hollow rotor shaft, said fuel stem connected to fuel conveying lines which extend through the rotor blades to the rocket engines;
governor means in said fuel lines; and
said pilot operable control means for adjusting the governor to increase or decrease the fuel flow to said rocket engines so as to adjust the main rotor rotational speed.

29. A rotary wing aircraft as defined in claim 28, wherein:
said means between said main rotor blades and said fuselage comprising a cone shaped housing pivotable at its smaller end to a universal joint, a swash plate rotatable about said smaller end and cross linkages connecting said swash plate and said rotor blades whereby upon pivotable movement of said housing about said universal joint the crossed links act on the rotor blades to effect tipping of the plane of the rotor blades opposite to the direction of pivotal movement of said housing.

30. A rotary wing aircraft as defined in claim 28, and:
said fuel stem is driven by said main rotor blades at one end, the opposite end of which extends into a gear box below the top of the fuselage but offset therefrom, gear means near the lower end of said fuel stem within said gear box cooperates with additional gear means, the latter operable to drive the tail rotor means extending from said fuselage and pump means to pump fuel through said fuel lines and fuel stem to said rocket engines.

31. A rotary wing aircraft as defined in claim 28, and: said control means being a single handle connected to the housing whereby forward or rearward movement of the handle pivots the housing in a like direction whereby the tip plane of the rotor blades tilts opposite to the direction of movement of the handle thus causing the aircraft to move forwardly or rearwardly according to the tilt of the plane of the rotor blades.

32. A rotary wing aircraft as defined in claim 31, and: said handle connected to the housing through a tilt rod the extreme rear end of which is fulcrumed on an anchor whereby upon upward or downward movement of the handle the housing moves vertically on the shaft causing the crossed linkages to operate on the rotor blades to increase or decrease the pitch of the rotor blades thus permitting the aircraft to ascend or descend according to the upward or downward movement of said handle.

33. A rotary wing aircraft as defined in claim 31, and: said handle pivotable about a vertical axis, bracket means attached to the upper end of said handle but offset therefrom, flexible cable means attached to said offset bracket at one end and at the other to a tail rotor, pivotable means connecting the tail rotor to said flexible cable whereby upon rotation of said handle about said vertical axis the flexible cable operates on the tail rotor through interconnection with the pivotal means to change the collective pitch of the tail rotor whereby the tail rotor acts on the air to cause the tail rotor and tail rotor boom to rotate the aircraft about its vertical axis.

34. A rotary wing aircraft as defined in claim 31, and: said handle has throttle control means thereon, said throttle control means operable through suitable linkages to reciprocate a rod which is attached to one arm of a bell crank, the opposite end of which is attached to a second rod which extends through said fuel stem and said hollow shaft, the upper end of said second rod is connected to said governor through a linkage which converts linear motion to rotary motion whereby when said throttle is rotated through a horizontal axis the governor is adjusted and functions to adjust valving therein to vary the fuel flow to the rocket engines.

\* \* \* \* \*